US008665226B2

(12) United States Patent
Liu et al.

(10) Patent No.: US 8,665,226 B2
(45) Date of Patent: Mar. 4, 2014

(54) CAPACITIVE TOUCH PANEL

(75) Inventors: Chen-Yu Liu, Taoyuan County (TW); Kwan-Sin Ho, Miaoli County (TW)

(73) Assignee: TPK Touch Solutions Inc., Taipei (TW)

( * ) Notice: Subject to any disclaimer, the term of this patent is extended or adjusted under 35 U.S.C. 154(b) by 660 days.

(21) Appl. No.: 12/371,983

(22) Filed: Feb. 17, 2009

(65) Prior Publication Data

US 2009/0207151 A1 Aug. 20, 2009

(30) Foreign Application Priority Data

Feb. 18, 2008 (TW) ................................ 97202841 U

(51) Int. Cl.
*G06F 3/045* (2006.01)

(52) U.S. Cl.
USPC ............................. 345/173; 345/169; 345/179

(58) Field of Classification Search
USPC ......................................... 345/173, 169, 179
See application file for complete search history.

(56) References Cited

U.S. PATENT DOCUMENTS

| 5,457,289 | A | 10/1995 | Huang et al. |
| 6,259,491 | B1 | 7/2001 | Ekedahl |
| 6,876,355 | B1 | 4/2005 | Ahn |
| 6,879,319 | B2 | 4/2005 | Cok |
| 7,126,589 | B2 | 10/2006 | Sung |
| 7,268,770 | B1 | 9/2007 | Takahata |
| 7,405,779 | B2 | 7/2008 | Sanelle |
| 7,554,624 | B2 | 6/2009 | Kusuda |
| 7,763,832 | B2 * | 7/2010 | Striegler et al. .......... 219/448.11 |
| 2001/0020987 | A1 | 9/2001 | Ahn et al. |
| 2003/0234770 | A1 | 12/2003 | MacKey |
| 2004/0238835 | A1 | 12/2004 | Grupp et al. |
| 2005/0035953 | A1 | 2/2005 | Woolley |
| 2005/0083307 | A1 * | 4/2005 | Aufderheide et al. ........ 345/173 |
| 2005/0126831 | A1 | 6/2005 | Richter et al. |
| 2005/0260338 | A1 * | 11/2005 | Chien .......................... 427/96.1 |
| 2006/0001800 | A1 | 1/2006 | Sanelle |
| 2006/0114374 | A1 | 6/2006 | Segawa et al. |
| 2006/0146033 | A1 | 7/2006 | Chen et al. |
| 2006/0227114 | A1 * | 10/2006 | Geaghan et al. ............. 345/173 |
| 2006/0266640 | A1 | 11/2006 | Halsey, IV et al. |
| 2007/0030255 | A1 | 2/2007 | Pak et al. |
| 2007/0200832 | A1 | 8/2007 | Cho et al. |
| 2007/0240914 | A1 * | 10/2007 | Lai et al. .................... 178/18.06 |
| 2007/0242055 | A1 | 10/2007 | Lai |
| 2008/0117186 | A1 | 5/2008 | Wang et al. |
| 2008/0150901 | A1 | 6/2008 | Lowles |
| 2008/0165158 | A1 * | 7/2008 | Hotelling et al. ............ 345/174 |

(Continued)

FOREIGN PATENT DOCUMENTS

| CN | 99101772.2 | 10/1999 |
| CN | 1565036 A | 1/2005 |
| CN | 101051256 A1 | 10/2007 |
| CN | 101059737 A | 10/2007 |
| EP | 1387246 A1 | 2/2004 |

(Continued)

OTHER PUBLICATIONS

European Patent Office Communication pursuant to Article 94(3) EPC, Berlin, Germany, dated Mar. 12, 2010, 35 pages.

*Primary Examiner* — Claire X Pappas
*Assistant Examiner* — Afroza Chowdhury
(74) *Attorney, Agent, or Firm* — Gokalp Bayramoglu

(57) ABSTRACT

An integrally-formed capacitive touch panel is disclosed including: a singular lens substrate, a mask layer, and a sensing circuit integrally coupled with said singular lens substrate. Said singular lens substrate, said mask layer, and said sensing circuit are integrally formed.

57 Claims, 8 Drawing Sheets

(56) References Cited

U.S. PATENT DOCUMENTS

| | | |
|---|---|---|
| 2009/0015563 A1 | 1/2009 | Sadler |
| 2009/0046078 A1 | 2/2009 | Kent |
| 2009/0090694 A1 | 4/2009 | Hotelling et al. |
| 2009/0091551 A1 | 4/2009 | Hotelling et al. |
| 2009/0096765 A1 | 4/2009 | Kuo |
| 2009/0160817 A1 | 6/2009 | Wu et al. |
| 2009/0194344 A1 | 8/2009 | Harley et al. |
| 2009/0201258 A1 | 8/2009 | Griffin et al. |
| 2009/0322705 A1* | 12/2009 | Halsey, IV .................. 345/174 |
| 2010/0033354 A1 | 2/2010 | Ejlersen |
| 2010/0084253 A1 | 4/2010 | Bollmann et al. |
| 2010/0164896 A1* | 7/2010 | Nakayama et al. ........... 345/173 |
| 2010/0188360 A1 | 7/2010 | Joung et al. |
| 2010/0328228 A1* | 12/2010 | Elias ............................ 345/173 |
| 2011/0199332 A1 | 8/2011 | Hung et al. |
| 2013/0100039 A1* | 4/2013 | Hong et al. .................. 345/173 |
| 2013/0141385 A1* | 6/2013 | Liu et al. ..................... 345/174 |
| 2013/0141386 A1* | 6/2013 | Liu et al. ..................... 345/174 |

FOREIGN PATENT DOCUMENTS

| | | |
|---|---|---|
| EP | 1746485 A2 | 1/2007 |
| JP | 2002366302 A | 12/2002 |
| JP | 2003173238 A | 6/2003 |
| JP | 2007179520 A | 7/2007 |
| KR | 10-2006-0083129 | 7/2006 |
| KR | 10-2006-0128888 | 12/2006 |
| KR | 10-2007-0017296 | 2/2007 |
| WO | WO2004/114265 A2 | 12/2004 |
| WO | WO2005/040901 A2 | 5/2005 |
| WO | WO2005114369 A2 | 12/2005 |
| WO | WO2007102238 A1 | 9/2007 |

* cited by examiner

CAPACITIVE TOUCH PANEL

CROSS-REFERENCE TO RELATED APPLICATIONS

This application claims priority to Taiwan Patent Application No. 97202841 filed Feb. 18, 2008. By this reference, the full disclosure, including the drawings, of said U.S. patent application is incorporated herein.

BACKGROUND

1. Field of the Invention

The invention relates to a touch panel, especially to a capacitive touch panel assembled with a display panel.

2. Description of the Related Art

Most electronic devices, such as PDA, palm-sized PC and information appliance, have a touch display panels. The touch display panel includes a lens, a display panel and a touch panel arranged between the lens and the display panel. In the prior art, the lens and the touch panel are separately formed on different substrates, which are usually glass substrates. The lens and the touch panel are then laminated to form a touch module. The touch module is further stacked up with and attached to the display panel to form the touch display panel. A user can touch objects displayed on the touch display panel with his or her finger or a touch pen to input information or perform an operation.

Please refer to FIG. 6. FIG. 6 is a sectional view of a conventional touch display panel. As illustrated in FIG. 6, in the prior art, a touch panel 6 is disposed between a display panel 2b and a lens 5. A black layer 51 is provided on the periphery of a lower surface of the lens 5. The black layer 51 is stuck to the periphery of the upper surface of the touch panel 6. There is a stick layer 4c disposed between the black layer 51 and the touch panel 6, as shown in FIG. 6. For the conventional touch panel 6, conductive layers are formed on the upper surface of a glass substrate 61. The conductive layers include at least a lower transparent conductive layer 62 and an upper transparent conductive layer 65. The conductive layers may include but not be limited to an indium-tin-oxide (ITO) material. A transparent insulation layer 64 is formed between the upper transparent conductive layer 65 and the lower transparent conductive layer 62. On each periphery of the upper transparent conductive layer 65 and the periphery of the lower transparent conductive layer 62, a metal trace 63 is formed respectively for transmitting signals thereon. The black layer 51 is arranged to cover the metal traces 63 so that the metal traces 63 are not exposed when viewed from above the lens 5 for prettifying the appearance of the lens 5. A transparent overcoat 66 made of insulation material (such as silicon nitride, silicon dioxide, etc.) is formed above the upper transparent conductive layer 65 to prevent the upper transparent conductive layer 65 from being scraped and damaged. The coordinates of a position that has been touched on the touch panel 6 is obtained according to detection of an induced current corresponding to a capacitive generated between the transparent conductive layers 62 and 65 and the human body.

The display panel 2b may include a liquid crystal display (LCD) formed by providing a liquid crystal layer 24b between an upper glass substrate 22b and a lower glass substrate 26b. An upper polarizing plate 21b is provided on a top surface of the upper glass substrate 22b, and a transparent conductive layer 23b is provided between the liquid crystal layer 24b and a bottom surface of the upper glass substrate 22b. A lower polarizing plate 27b is provided on a bottom surface of the lower glass substrate 26b. Another transparent conductive layer 25b is provided between the liquid crystal layer 24b and a bottom surface of the lower glass substrate 26b. The upper glass substrate 22b and the transparent conductive layer 23b form an upper glass electrode substrate. The lower glass substrate 26b and the transparent conductive layer 25b form a lower glass electrode substrate. The display panel 2b and the touch panel 6 are laminated together with a stick layer 4b disposed between them.

As illustrated in FIG. 6, the liquid crystal layer 24b is sandwiched between the upper glass electrode substrate and the lower glass electrode substrate. Driven by an electric field between the upper glass electrode substrate and the lower glass electrode substrate, the liquid crystal molecules contained by the liquid crystal layer 24b are twisted to determine whether light from a light source can pass through. Further, the liquid crystal display displays a colorful image using a color filter for the upper glass substrate 22b. A user then may see an image from the top of the lens 5. The user then is able to perform an operation or input information by touching the lens 5 with the indication conveyed by the image.

As described above, in the prior art, each of the lens 5 and the touch panel 6 is formed on a glass substrate separately and individually, wherein the glass substrate 61 of the touch panel is individually shown in FIG. 6. After separate and individual fabrication, the lens 5 and the touch panel 6 are then laminated. Each of the lens 5 and the glass substrate 61 of the touch panel 6 is made of same glass material, which increases the consumption of glass material in production of the touch display panel. Besides, the assembling process is very complex and time wasting, and it is easy to generate defective products during the lamination process. Furthermore, the thickness of the touch display panel is hard to reduce for both the lens and the touch panel adopt the glass substrates.

In view of the foregoing, there is a need for a capacitive touch panel that can alleviate the aforementioned disadvantages.

BRIEF SUMMARY

One object of the invention is to provide an integrally-formed capacitive touch panel which has a low cost, a high yield rate and a simplified assembling process.

Another object of the invention is to provide a integrally-formed slim-type capacitive touch panel.

An exemplary embodiment of the integrally-formed capacitive touch panel is disclosed comprising: a singular lens substrate having a first surface and a second surface, a mask layer, and a sensing circuit integrally coupled with said singular lens substrate. Said singular lens substrate, said mask layer, and said sensing circuit are integrally formed.

An exemplary embodiment of the integrally-formed slim-type capacitive touch panel is disclosed comprising: a singular substrate having a top surface for receiving physical tactile input and a bottom surface, a mask layer, and a sensing circuit. Said mask layer and said sensing circuit are integrally formed on the bottom surface of said singular substrate.

It is to be understood that both the foregoing general description and the following detailed description are exemplary and explanatory only and are not restrictive of the invention, as claimed.

DETAILED DESCRIPTION

Figure 1:
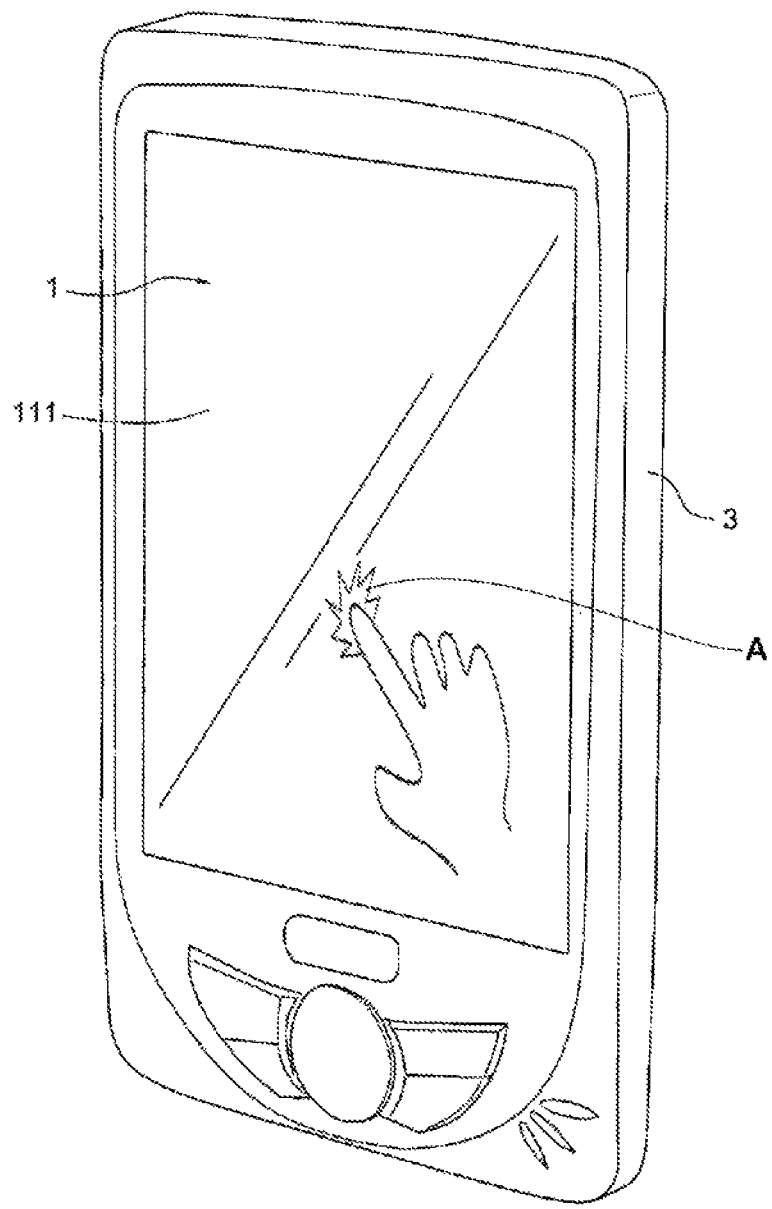
FIG. 1 is a perspective view showing an electronic device with a capacitive touch panel of the invention.
Figure 2:
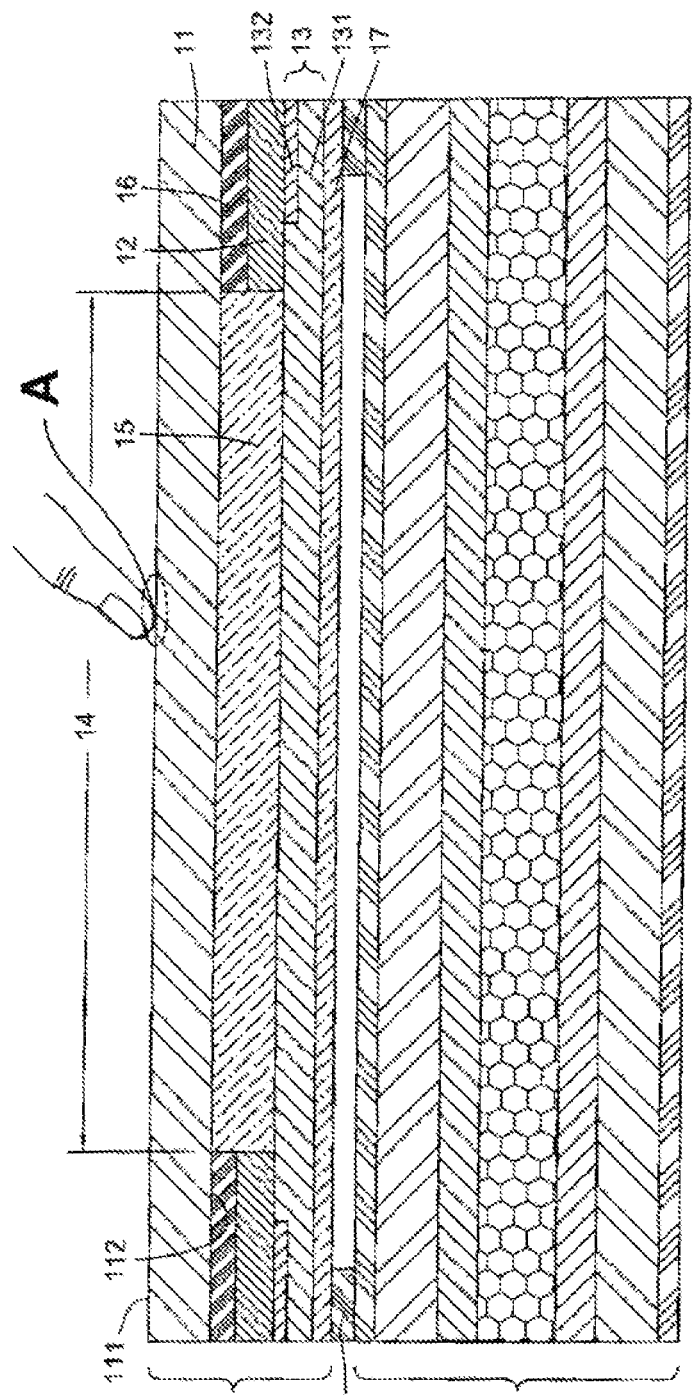
FIG. 2 is a sectional view of a touch display panel including a capacitive touch panel according to an exemplary embodiment of the invention.

FIG. 1 is a perspective view showing an electronic device with an integrally-formed capacitive touch panel 1 of the invention. The capacitive touch panel 1 is assembled in a shell 3 of the electronic device, as illustrated in FIG. 1. FIG. 2 is a sectional view showing the capacitive touch panel 1 disposed on a display panel 2 according to one exemplary embodiment of the invention. In the present invention, the capacitive touch panel 1 includes a singular substrate 11, a mask layer 12 and a sensing circuit 13. The singular substrate 11, the mask layer 12 and the sensing circuit 13 are integrally formed. Therefore, there is no need to adopt other substrates for the integrally-formed capacitive touch panel 1, and there is no need to perform lamination in the assembly of the present touch panel as required in the conventional touch module. The details are illustrated as below.

The singular substrate 11 may be made of glass material to form a singular lens substrate. The singular substrate 11 may be otherwise made of plastic material, which includes but is not limited to rubber and ebonite. The singular substrate 11 includes a top surface 111 for receiving physical tactile input and a bottom surface 112 of the singular substrate 11.

Figure 4:
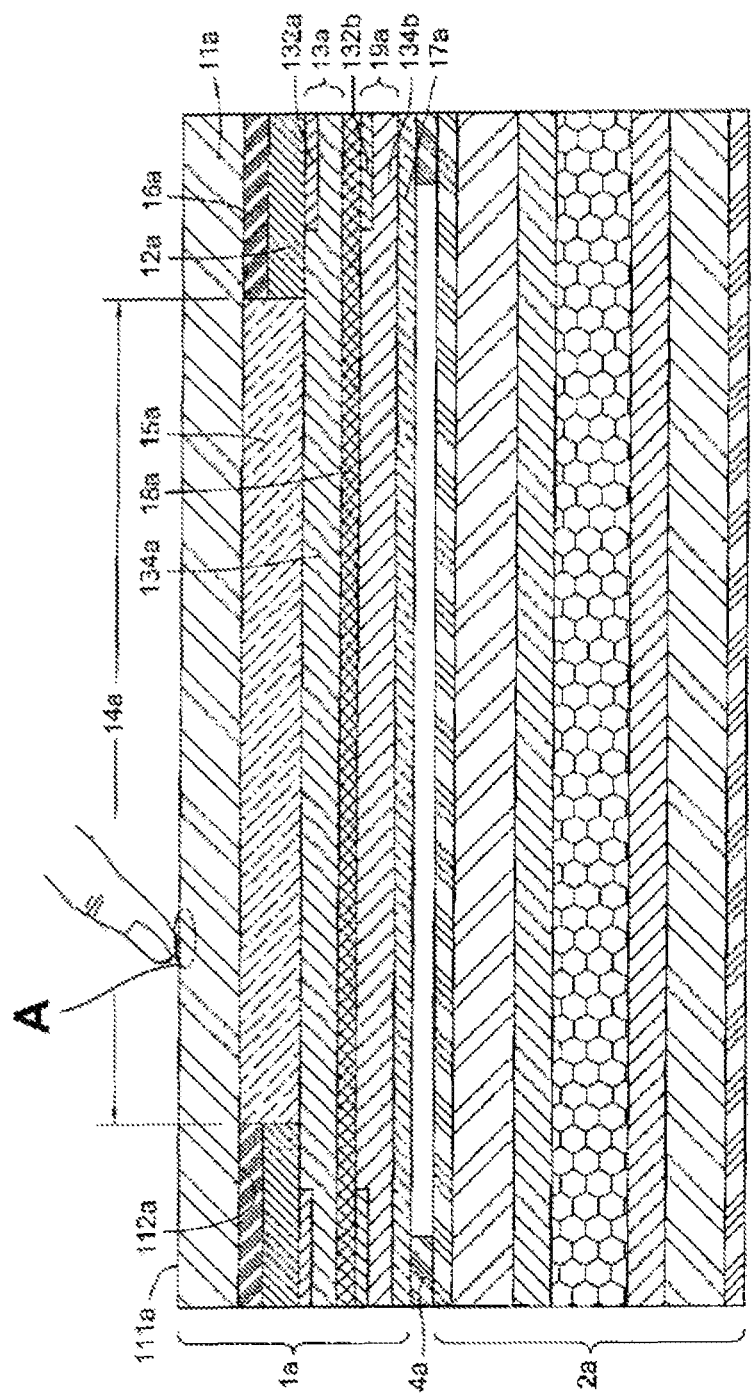
FIG. 4 is a sectional view of a touch display panel including a capacitive touch panel according to an exemplary embodiment of the invention.
Figure 7:
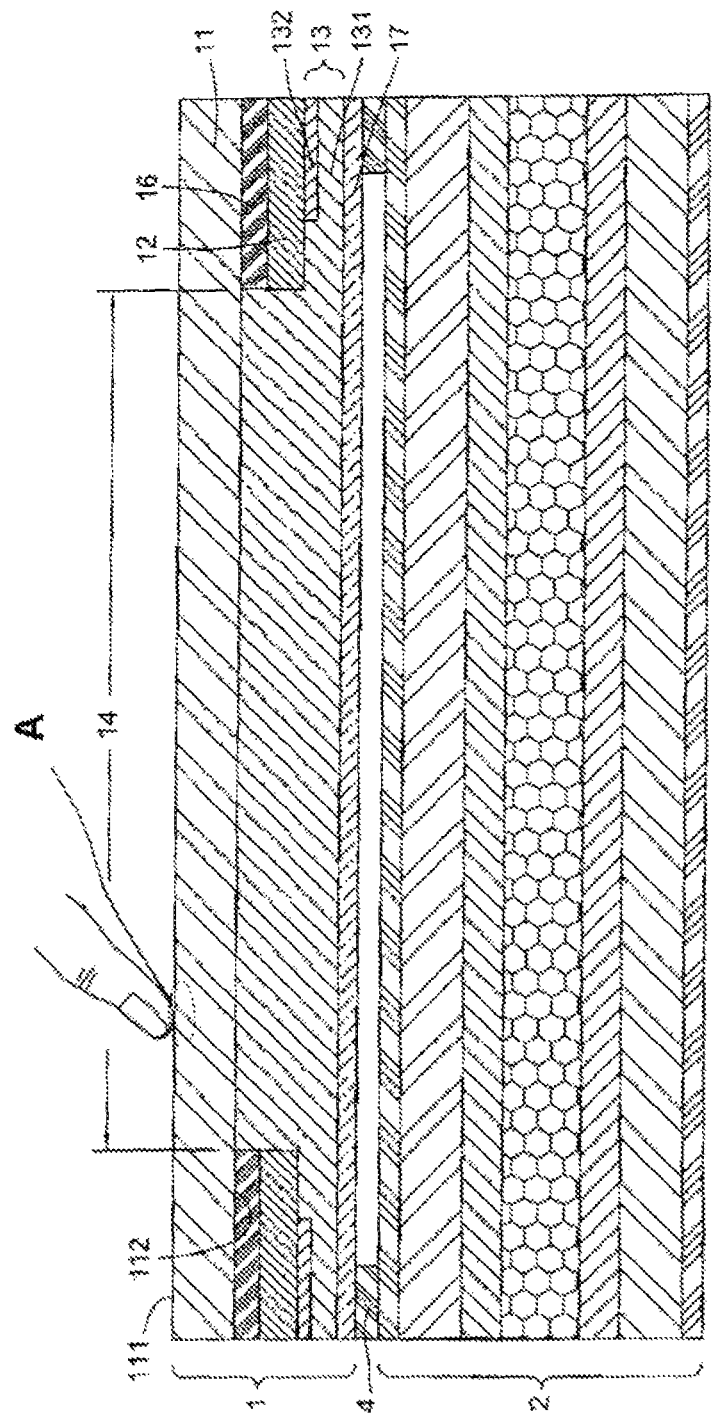
Figure 8:
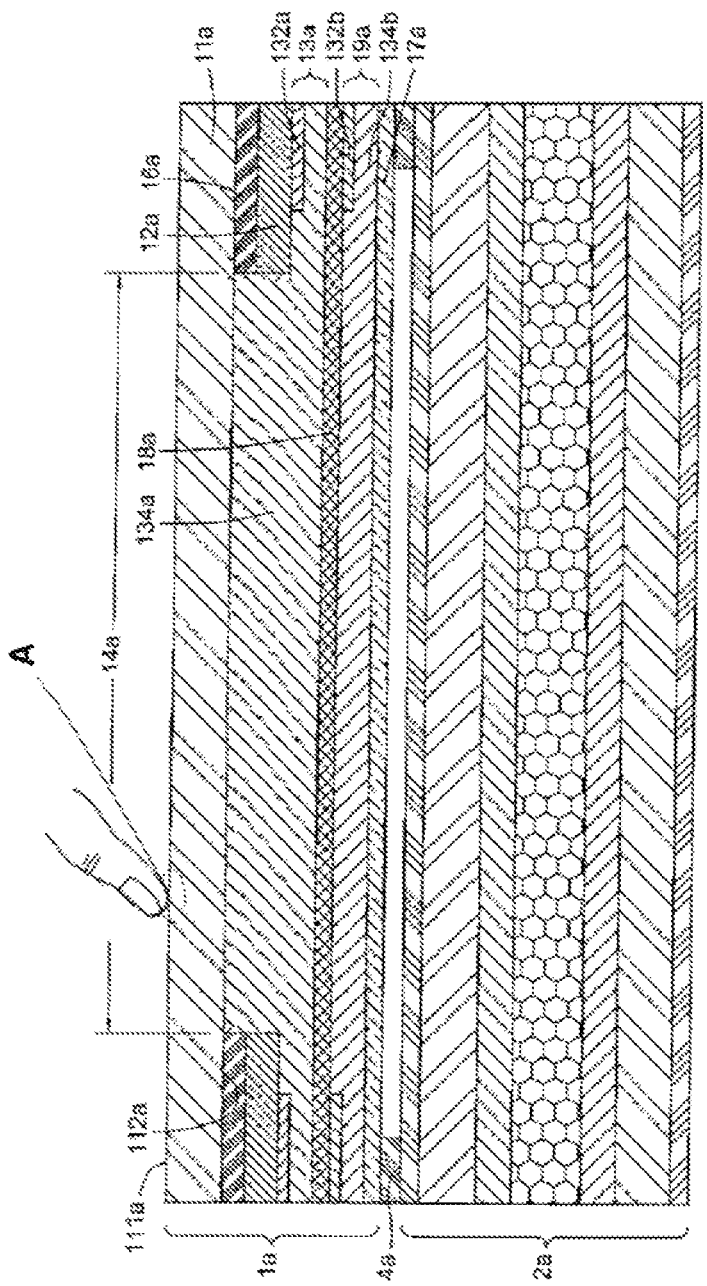

FIG. 7 is a sectional view of a touch display panel including a capacitive touch panel according to an exemplary embodiment of the invention, which is similar to the embodiment of FIG. 2 but without the smooth layer;

FIG. 8 is a sectional view of a touch display panel including a capacitive touch panel according to an exemplary embodiment of the invention, which is similar to the embodiment of FIG. 4 but without the smooth layer.

The mask layer 12 is integrally formed on the bottom surface 112 of the singular substrate 11, and the mask layer 12 may be a black resist or other opaque coating layer. A smooth layer 15 is provided on one side of the singular substrate 11, as illustrated in FIG. 2. In the fabrication process according to the present invention, the smooth layer 15 is provided such that the lower surface of the mask layer 12 may be smoothened and the sensing circuit 13 grown thereon may be flatter. The yield rate of the final product of the touch panel 1 can be enhanced in accordance. The smooth layer 15 may be made of transparent organic or inorganic material. Please be noted that the smooth layer 15 is optional in the present invention. The structure illustrated in FIG. 2 is only exemplary. FIG. 7 shows an exemplary embodiment of the invention, which is similar to the embodiment of FIG. 2 but without the smooth layer.

As illustrated in FIG. 2, part of the sensing circuit 13 is grown on a bottom surface of the mask layer 12, hence, when viewed from above the singular substrate 11, it appears that that part of the sensing circuit 13 is "covered" by the mask layer 12. The exposed part of the sensing circuit 13, that is, the part of the sensing circuit 13 that is not grown under the mask layer 12, forms a sensing region 14.

Figure 3:
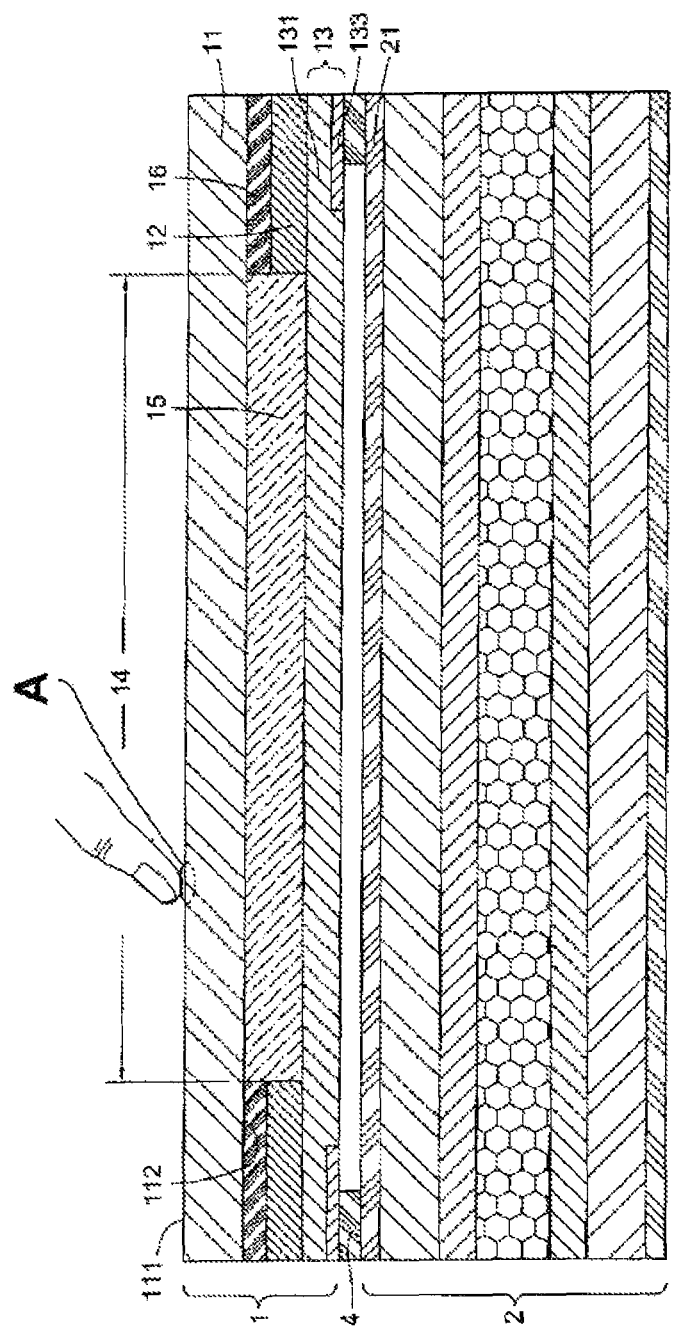
FIG. 3 is a sectional view of a touch display panel including a capacitive touch panel according to an exemplary embodiment of the invention.

The effective range of the sensing region 14 includes the area marked in FIG. 2 and FIG. 3. In the sensing region 14, the sensing circuit 13 is not grown on the bottom surface of the mask layer 12 but on a lower surface of the smooth layer 15. According to an exemplary embodiment of the present invention, a shielding layer 16 may be provided on the bottom surface of the singular substrate 11, and the mask layer 12 is grown thereon. The shielding layer 16 may prevent noise signals.

The sensing circuit 13 may be formed by coating, exposing, developing and etching. In one of the exemplary embodiments, the sensing circuit 13 includes a conductive electrode 131. The sensing circuit 13 may further include a metal trace 132, as shown in FIG. 2. The metal trace 132 can be arranged on the top surface of the conductive electrode 131. Please refer to FIG. 3. FIG. 3 is a sectional view of a touch display panel including a capacitive touch panel according to another exemplary embodiment of the invention. As illustrated in FIG. 3, a metal trace 133 is arranged on the bottom surface of the conductive electrode 131. The metal trace 132 in the embodiment shown in FIG. 2 and the metal trace 133 in the embodiment shown in FIG. 3 are both "covered" by the mask layer 12 from a view above the singular substrate 11. Because from above the singular substrate 11 the metal traces 132 and 133 are not exposed, the appearance of the singular substrate 11 is improved.

The conductive electrode 131 is usually made of transparent conductive material (such as indium tin oxide (ITO)). An overcoat 17 (as shown in FIG. 2) is coated on the lower surface of the sensing circuit 13. An adhesive layer 4 is provided between the integrally-formed capacitive touch panel 1 and the periphery of the display panel 2. In one exemplary embodiment as shown in FIG. 2, the adhesive layer 4 is provided between the overcoat layer 17 and the display panel 2, while the overcoat 17 may be omitted in other embodiments, as shown in FIG. 3, for example, and the adhesive layer 4 is directly arranged between the sensing circuit 13 and the display panel 2.

According to the present invention, when the top surface 111 of the singular substrate 11 receives a physical tactile input A, the conductive electrode 131 in the sensing region 14 outputs a capacitive sensing signal corresponding to the touched position for a capacitive effect is produced by the physical tactile input received by the top surface 111 of the singular substrate 11. The capacitive sensing signal is transmitted along the metal trace, 132 or 133, to a processor (not shown) for detecting/calculating the coordinates of the touched position.

In the present invention, within the touch panel, the lens and the sensing circuit share the same singular substrate and are integrally formed. Thus, substrates conventionally utilized for the lens and the touch panel separately can be reduced. Therefore, the bonding and lamination process in the conventional touch display panel fabrication can be simplified. The cost and time for producing the touch panel can be reduced and the touch panel can also be of a slim type design.

FIG. 4 is a sectional view showing the capacitive touch panel 1a assembled on a display panel 2a according to another embodiment of the invention. The capacitive touch panel 1a includes a singular lens substrate 11a, a mask layer 12a, a first sensing circuit 13a, an insulation layer 18a and a second sensing circuit 19a. According to the invention, the singular lens substrate 11a, the mask layer 12a, the first sensing circuits 13a, the insulation layer 18a and the second sensing circuit 19a of the capacitive touch panel 1a are integrally formed.

The singular lens substrate 11a may be made of different transparent material. The singular lens substrate 11a includes a top surface 111a for receiving physical tactile input and a bottom surface 112a.

The mask layer 12a is provided on the bottom surface 112a of the singular lens substrate 11a. The mask layer 12a may be a black resin or other opaque coating material.

The first sensing circuit 13a is grown on the singular lens substrate 11a and the mask layer 12a. The smooth layer 15a, made of transparent organic or inorganic material, is provided on the singular lens substrate 118 in some of the exemplary embodiments of the present invention such that the first sensing circuit 13a grown thereon may be flatter. Please note that the smooth layer 15a is optional in the present invention and may be omitted in different embodiments. FIG. 8 shows an exemplary embodiment of the invention, which is similar to the embodiment of FIG. 4 but without the smooth layer. As illustrated in FIG. 4, partial of the first sensing circuit 13a is grown on a bottom surface of the mask layer 12a, hence, when viewed from above the singular lens substrate 11a, it appears that part of the first sensing circuit 13a is "covered" by the mask layer 12a. The exposed part of the first sensing circuit 13a, that is, the part of the first sensing circuit 13 not grown under the mask layer 12a, forms a sensing region 14a. When a physical tactile input is received by the top surface 11a, the first sensing circuit 13a may output a first axial sensing signal and the second sensing circuit 19a may output a second axial sensing signal in accordance.

The insulation layer 18a is provided to insulate the first sensing circuit 13a and the second sensing circuit 19a. The two sensing circuits 13a and 19a are orthogonal to each other. Therefore, the insulation layer 18a is used to electrically insulate the first sensing circuit 13a and the second sensing circuit 19a. The insulation layer 18a may be fully distributed between the two sensing circuits or only in some area to prevent the contact of first sensing circuit 13a and the second sensing circuit 19a in the intersection area.

According to an exemplary embodiment of the present invention, a shielding layer 16a may be provided on the bottom surface of the singular lens substrate 11a, and the mask layer 12a is further grown thereon. The shielding layer 16a may introduce prevention of noise signals. In some exemplary embodiments, the width of the shielding layer 16a may be equal to the width of the mask layer 12a.

Figure 5:
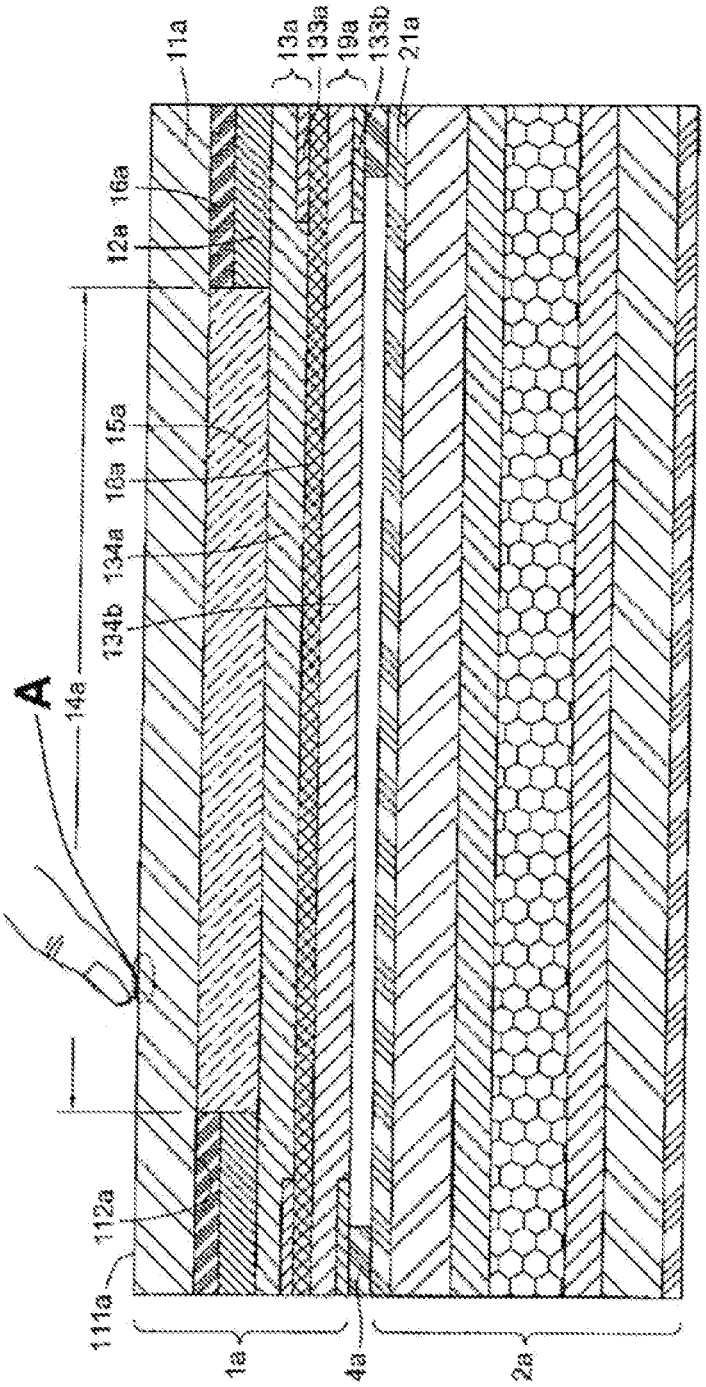
FIG. 5 is a sectional view of a touch display panel including a capacitive touch panel according to an exemplary embodiment of the invention.
Figure 6:
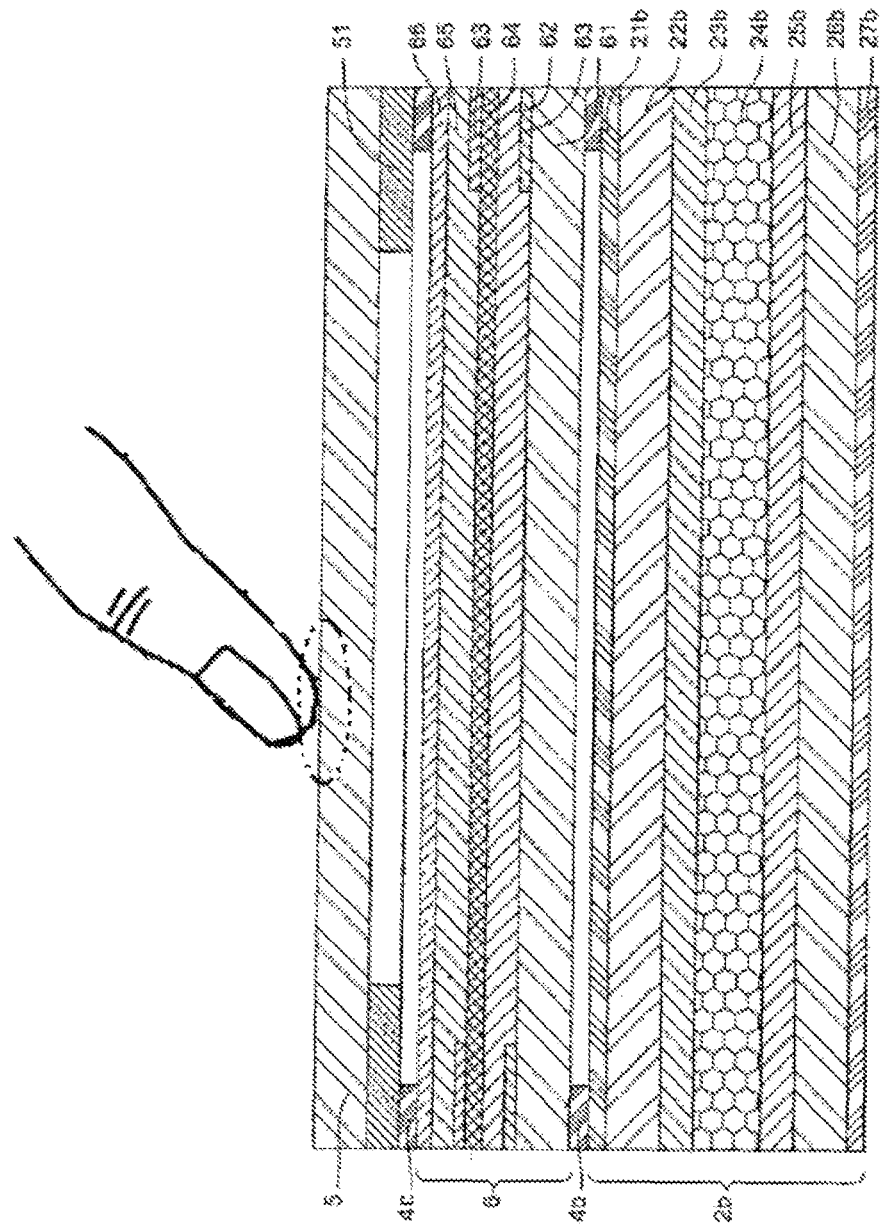
FIG. 6 is a sectional view of a touch display panel according to the prior art.

In one of the exemplary embodiments, the first sensing circuit 13a includes a conductive electrode 134a. The first sensing circuit 13a may further include a metal trace 132a arranged on the conductive electrode 134a. As illustrated in FIG. 4, the metal trace 132a may be arranged on the top surface of the conductive electrode 134a. Please refer to FIG. 5. FIG. 5 is a sectional view of a touch display panel including a capacitive touch panel according to another exemplary embodiment of the invention. As shown in FIG. 5, the metal trace 133a may be arranged on the bottom surface of the conductive electrode 134a. The metal trace 132a in the embodiment shown in FIG. 4 and the metal trace 133a in the embodiment shown in FIG. 5, when viewed from above (e.g., above the singular substrate 11a) are both "covered" by the mask layer 12a. Because when viewed from above the singular substrate 11a, the metal traces 132a and 133a are not exposed, the appearance of the singular lens substrate 11a is improved.

The second sensing circuit 19a includes a conductive electrode 134b. In one of the exemplary embodiments, the second sensing circuit 19a may further include a metal trace 132b arranged on the conductive electrode 134b. As illustrated in FIG. 4, the metal trace 132b may be arranged on the top surface of the conductive electrode 134b. In another exemplary embodiment shown in FIG. 5, the metal trace 133b may be arranged on the bottom surface of the conductive electrode 134b. Similarly, the metal trace 132b in the embodiment shown in FIG. 4 and the metal trace 133b in the embodiment shown in FIG. 5 are both "covered" by the mask layer 12a when viewed from above the singular lens substrate 11a. The metal traces 132b and 133b are not visually exposed when viewed from above the singular lens substrate 11a.

An adhesive layer 4a is provided between the capacitive touch panel 1a and the display panel 2a. In the exemplary embodiment shown in FIG. 4, an overcoat 17a is selectively further included and integrally formed on the bottom surface of the second sensing circuit 19a. As shown in FIG. 5, the overcoat 17a is omitted, and the adhesive layer 4a is directly bonded to the second sensing circuit 19a and the display panel 2a.

According to the present invention, when the top surface 111a of the singular lens substrate 11a in the sensing region receives a physical tactile input A, each of the conductive electrode 134a and the conductive electrode 134b outputs a capacitive sensing signal corresponding to the touched position, respectively. The capacitive sensing signals are transmitted along the corresponding metal traces to a processor (not shown) for detecting/calculating the coordinates of the touched position.

In the present invention, within the capacitive touch panel, the lens, the mask layer and the sensing circuit share the same singular substrate and are integrally formed. The mask layer and the sensing circuit may be formed on the same side of the singular substrate, as illustrated in previous exemplary embodiments of the invention. However, in the present invention, it is possible to form the mask layer and the sensing circuit on the opposite side of the singular substrate. In other embodiments, the sensing circuit of the present invention may be coupled with the singular substrate and/or the mask layer. In still the other embodiments of the present invention, the mask layer and the sensing circuit may be integrally formed on the bottom surface of said singular substrate. According to the present invention, the substrates conventionally provided for the lens and the touch panel separately can be reduced. Therefore, the lamination process in the conventional touch display panel fabrication can be simplified. The cost and time for producing the touch panel can be reduced, and the size of the capacitive touch panel can be reduced.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An integrally-formed capacitive touch panel, comprising: a singular lens substrate having a top surface for receiving physical tactile input: and a bottom surface; a mask layer having a top surface and a bottom surface; wherein said mask layer is placed on said bottom surface of said singular lens substrate; wherein an un-covered region of said singular lens substrata is defined as a sensing region; a sensing circuit: integrally coupled with a smooth layer having a top surface and a bottom surface; and said smooth layer is placed between said singular lens substrata end said sensing circuit in said sensing region; said sensing circuit is arranged on said bottom surface of said mask layer and said bottom surface of said smooth layer; and wherein said sensing circuit, said mask layer and said smooth are integrally formed on said bottom surface of said singular lens substrate.

2. The integrally-formed capacitive touch panel of claim 1, wherein said sensing circuit further comprises: a first sensing circuit; an insulation layer; and a second sensing circuit, wherein said singular lens substrate, said mask layer, said first sensing circuit, said insulation layer, and said second sensing circuit are integrally formed, and wherein said integrally-formed capacitive touch panel is capable of directly coupling with a display panel.

3. The integrally-formed capacitive touch panel of claim 1, wherein said mask layer is formed on the periphery of said bottom surface of said singular lens substrate.

4. The integrally-formed capacitive touch panel of claim 1 further comprising: a shielding layer formed on the periphery of said singular lens substrate, wherein said shielding layer is positioned between said singular lens substrate and said mask layer.

5. The integrally-formed capacitive touch panel of claim 1, wherein said sensing circuit comprises a conductive electrode and a metal trace.

6. The integrally-formed capacitive touch panel of claim 5, wherein said metal trace is formed on a surface of said mask layer, wherein said mask layer covers areas covered by said metal trace.

7. The integrally-formed capacitive touch panel of claim 1, wherein said integrally-formed capacitive touch panel is capable of being disposed on a display panel.

8. The integrally-formed capacitive touch panel of claim 1, further comprising: an overcoat integrally formed or} a surface of said sensing circuit; and an adhesive layer disposed on said overcoat for bonding with a display panel.

9. The integrally-formed capacitive touch panel of any one of claim 2 or 4-8, wherein said mask layer is formed on the periphery, of said bottom
surface of said singular lens substrate.

10. The integrally-formed capacitive touch panel of any one of claim 2 or 5-8, further comprising: a shielding layer, wherein said shielding layer is positioned between said singular lens substrate and said mask layer.

11. The integrally-formed capacitive touch panel of claim 2, wherein said first sensing circuit comprises a first conductive electrode and a first metal trace, and said second sensing circuit comprises a second conductive electrode and a second metal trace.

12. The integrally-formed capacitive touch panel of claim 11, wherein said first metal trace or said second metal trace is formed on a surface of said mask layer, wherein said mask layer covers areas covered by said first metal trace and said second metal trace.

13. The integrally-formed capacitive touch panel of claim 7 or claim 8, wherein said sensing circuit comprises a conductive electrode and a metal trace; said metal trace is formed on a surface of said mask layer, wherein said mask layer covers areas covered by said metal trace.

14. The integrally-formed capacitive touch panel of claim 1, further comprising: a shielding layer formed on the periphery of said singular lens substrate, said shielding layer is positioned beb,~een said singular lens substrate and said mask layer; wherein said mask layer is formed on the periphery of said bottom surface of said singular lens substrata.

15. The integrally-formed capacitive touch panel of claim 14, wherein said integrally-formed capacitive touch panel is capable of being disposed on a display panel.

16. The integrally-formed capacitive touch panel of claim 2 or claim 14, further comprising: an overcoat integrally formed on a surface of said sensing circuit; and an adhesive layer disposed on the overcoat.

17. The integrally-formed capacitive touch panel of claim 1, wherein said singular lens substrate is made of transparent material.

18. The integrally-formed capacitive touch panel of claim 1, wherein said singular lens substrate is made of glass or plastic material.

19. The integrally-formed capacitive touch panel of claim 18, wherein said plastic material is rubber or ebonite.

20. The integrally-formed capacitive touch panel of claim 1, wherein said mask layer is made of black resist or other opaque coating material.

21. The integrally-formed capacitive touch panel of claim 1, wherein said smooth layer is made of transparent organic or inorganic material.

22. The integrally-formed capacitive touch panel of claim 4, wherein the width of the shielding layer is substantially equal to the width of the mask layer.

23. The integrally-formed capacitive touch panel of claim 5, wherein said conductive electrode is made of transparent conductive material.

24. The integrally-formed capacitive touch panel of claim 8, wherein said overcoat ms made of insulation material.

25. The integrally-formed capacitive touch panel of claim 1, wherein there is no other supporting layer laminated or bonded to said singular lens substrate of said integrally-formed capacitive touch panel.

26. The integrally-formed capacitive touch panel of claim 1, wherein said sensing circuit is a single layer circuit.

27. The integrally-formed capacitive touch panel of claim 5, wherein said conductive electrode outputs a capacitive sensing signal corresponding to a touched position for a capacitive effect produced by said physical tactile input on the top surface of said singular lens substrate.

28. The integrally-formed capacitive touch panel of claim 27, wherein said capacitive sensing signal is transmitted along said metal trace to a processor for detecting/calculating the coordinates of said touched position.

29. An integrally formed slim-type capacitive touch panel, comprising: a singular substrata having a top surface for receiving physical tactile input and a bottom surface; a mask layer having a top surface and a bottom surface: wherein said mask layer is place on said bottom surface of said singular lens substrata; wherein an un-covered region of the singular lens substrata is defined as a sensing region; a sensing circuit with a smooth layer having a top surface and a bottom surface; and said smooth laver is placed between said singular substrate and said sensing circuit in said sensing region: said sensing circuit: is arranged on said bottom surface of said mask layer and said bottom surface of said smooth laver; and wherein said sensing circuit, said mask layer and said smooth are integrally formed on said bottom surface of said singular substrate.

30. The integrally formed slim-type capacitive touch panel of claim 29, wherein the sensing circuit is coupled with the mask layer.

31. The integrally formed slim-type capacitive touch panel of claim 29, wherein said singular substrate is selected from the group consisting of glass material and plastic material.

32. The integrally-formed slim-type capacitive touch panel of claim 29, wherein said sensing circuit comprising: a first sensing circuit outputting a first axial sensing signal according to the physical tactile input received by said top surface; a second sensing circuit outputting a second axial sensing signal according to the physical tactile input received by said top surface; and a transparent insulation layer between said first sensing circuit and said second sensing circuit, said transparent insulation layer electrically insulates said first sensing circuit from said second sensing circuit, wherein said mask layer and said first sensing circuit: and said second sensing circuit: are integrally formed on the bottom surface of said singular substrate.

33. The integrally-formed slim-type capacitive touch panel of claim 29, wherein said mask layer is formed on the periphery of said bottom surface of said singular substrate.

34. The integrally-formed slim-type capacitive touch panel of claim 29, further comprising: a shielding layer formed on the periphery of said singular lens substrate, wherein said shielding layer is positioned between said singular substrate and said mask layer.

35. The integrally-formed slim-type capacitive touch panel of claim 29, wherein said sensing circuit comprises a conductive electrode and a metal trace.

36. The integrally-formed slim-type capacitive touch panel of claim 35, wherein said metal trace is formed on a surface of said mask layer, wherein said mask layer covers areas covered by said metal trace.

37. The integrally-formed slim-type capacitive touch panel of claim 29, wherein said integrally-formed capacitive touch panel is capable of being disposed on a display panel.

38. The integrally-formed slim-type capacitive touch panel of claim 29, further comprising: an overcoat integrally formed on a surface of said sensing circuit; and an adhesive layer disposed on said overcoat for bonding with a display panel.

39. The integrally formed slim-type capacitive touch panel of any one of claim 30-32 or 34-38, wherein said mask layer is formed on the periphery of said bottom surface of said singular substrate.

40. The integrally formed slim-type capacitive touch panel of any one of claim 30-32 or 35-38, further comprising: a shielding layer formed on the periphery of said singular substrate, wherein said shielding layer is positioned between said singular substrate and said mask layer.

41. The integrally formed slim-type capacitive touch panel of claim 32, wherein said first sensing circuit comprises a first conductive electrode and a first metal trace, and said second sensing circuit comprises a second conductive electrode and a second metal trace.

42. The integrally formed slim-type capacitive touch panel of claim 41, wherein said first metal trace or said second metal trace is formed on a surface of said mask layer, wherein said mask layer covers areas covered by said first metal trace and said second metal trace.

43. The integrally formed slim-type capacitive touch panel of claim 37 or claim 38, wherein said sensing circuit comprises a conductive electrode and a metal trace; said metal trace is formed on a surface of said mask layer, wherein said mask layer covers areas covered by said metal trace.

44. The integrally formed slim-type capacitive touch panel of claim 29, further comprising: a shielding layer formed on the periphery of said singular substrata, said shielding layer is positioned between said singular substrate and said mask layer; wherein said mask layer is formed on the periphery of said bottom surface of said singular lens substrata.

45. The integrally formed slim-type capacitive touch panel of claim 32 or claim 44, wherein said integrally formed slim-type capacitive touch panel is capable of being disposed on a display panel.

46. The integrally formed slim-type capacitive touch panel of claim 32 or claim 44, further comprising: an overcoat integrally formed on a surface of said sensing circuit; and an adhesive layer disposed on the overcoat.

47. The integrally formed slim-type capacitive touch panel of claim 29, wherein said singular substrate is made of transparent material.

48. The integrally formed slim-type capacitive touch panel of claim 31, wherein said plastic material is rubber or ebonite.

49. The integrally formed slim-type capacitive touch panel of claim 29, wherein said mask layer is made of black resist or other opaque coating material.

50. The integrally formed slim-type capacitive touch panel of claim 29, wherein said smooth layer is made of transparent organic or inorganic material.

51. The integrally-formed capacitive touch panel of claim 34, wherein the width of the shielding layer is substantially equal to the width of the mask layer.

52. The integrally formed slim-type capacitive touch panel of claim 35, wherein said conductive electrode is made of transparent conductive material.

53. The integrally formed slim-type capacitive touch panel of claim 38, wherein said overcoat is made of insulation material.

54. The integrally formed slim-type capacitive touch panel of claim 29, wherein there is no other supporting layer laminated or bonded to said singular substrate of said integrally-formed capacitive touch panel.

55. The integrally formed slim-type capacitive touch panel of claim 29, wherein said sensing circuit is a single layer circuit.

56. The integrally formed slim-type capacitive touch panel of claim 35, wherein said conductive electrode outputs a capacitive sensing signal corresponding to a touched position for a capacitive effect produced by said physical tactile input on the top surface of said singular substrate.

57. The integrally formed slim-type capacitive touch panel of claim 56, wherein said capacitive sensing signal is transmitted along said metal trace to a processor for detecting/calculating the coordinates of said touched position.

* * * * *